United States Patent [19]
Sidell

[11] 3,855,490
[45] Dec. 17, 1974

[54] SYNCHRONOUS MOTOR WITH FLUX CONDUCTOR

[75] Inventor: Philip A. Sidell, West Hartford, Conn.

[73] Assignee: McGraw-Edison Company, Elgin, Ill.

[22] Filed: Feb. 28, 1973

[21] Appl. No.: 336,837

Related U.S. Application Data
[63] Continuation of Ser. No. 175,664, Aug. 27, 1971.

[52] U.S. Cl. .................. 310/162, 310/156, 310/163
[51] Int. Cl. ............................................. H02k 21/18
[58] Field of Search .................. 310/156, 162–164, 310/103

[56] References Cited
UNITED STATES PATENTS

| | | |
|---|---|---|
| 2,265,781 | 12/1941 | Schweitzer, Jr. .................... 310/163 |
| 3,304,449 | 2/1967 | Pohlman et al. .................... 310/103 |
| 3,268,751 | 8/1966 | Nebiolo et al. ................. 310/162 X |

Primary Examiner—D. F. Duggan
Attorney, Agent, or Firm—Prutzman, Hayes, Kalb & Chilton

[57] ABSTRACT

Synchronous motor having a disk-type permanent magnet rotor having discrete uniformly circumferentially arranged peripheral poles. A flux conductor is fixed relative to the rotor to extend between its permanent magnetic poles of opposite polarity in series with alternating current stator pole projections.

10 Claims, 4 Drawing Figures

PATENTED DEC 17 1974 3,855,490
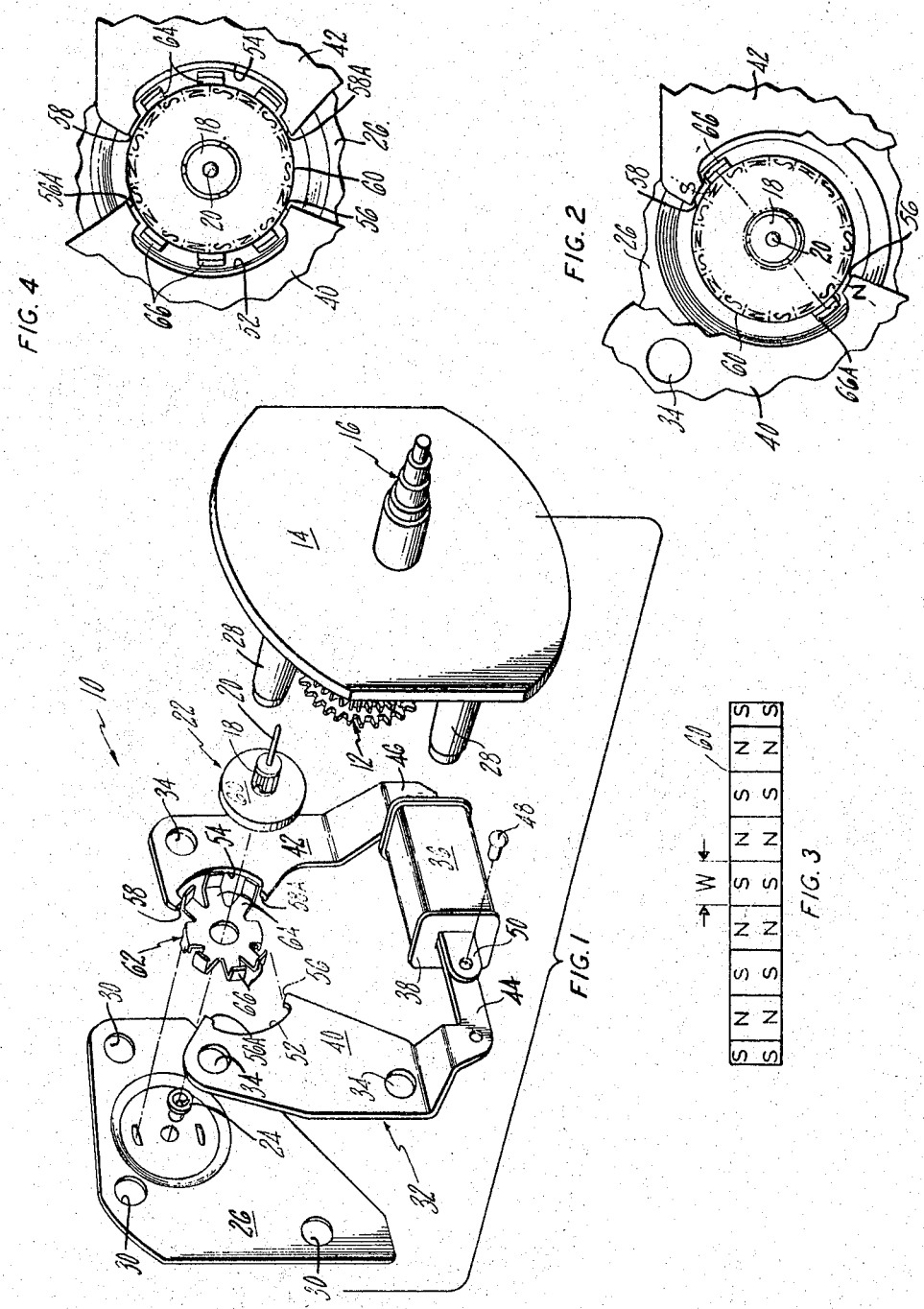

SYNCHRONOUS MOTOR WITH FLUX CONDUCTOR

This application is a continuation of applicant's prior co-pending application Ser. No. 175,664 filed Aug. 27, 1971.

This invention generally relates to synchronous motors and particularly concerns synchronous motors of a type utilizing a permanent magnet rotor.

A principal object of this invention is to provide a permanent magnet synchronous motor having significantly improved rotor torque output.

A further object of this invention is to provide an improved permanent magnet synchronous motor particularly suited for quick and easy low cost construction, dependable performance with minimum service requirements in a rugged construction characterized by structural simplicity and a high degree of electrical efficiency.

Other objects will be in part obvious and in part pointed out in more detail hereinafter.

A better understanding of the objects, advantages, features, properties and relationships of the invention will be obtained from the following detailed description and an accompanying drawing which sets forth an illustrative embodiment and is indicative of the way in which the principle of the invention is employed.

In the drawing:

FIG. 1 is an exploded isometric view of a motor incorporating the present invention;

FIG. 2 is an enlarged elevational view, partly broken away, showing instantaneous polarities of a simplified field plate structure of a motor of a type shown in FIG. 1 in cooperation with a permanent magnet rotor assembly;

FIG. 3 is an enlarged side edge view of the rotor schematically showing its permanent magnetic pole arrangement; and FIG. 4 is a view similar to FIG. 2 showing the field plate structure and a permanent magnet rotor assembly of the motor of FIG. 1.

Referring to the drawing in detail wherein a preferred embodiment of this invention is illustrated, a motor 10 is disclosed having gear clusters 12 of any desired number and configuration supported on a front plate 14 which also serves to journal a telescoped series of coaxially aligned output shafts generally designated 16. The gear clusters 12 provide desired speed relationship between the output shafts 16 and a pinion 18 mounted on a shaft 20 of a rotor assembly 22.

The rotor assembly 22 is supported for rotation in a rotor bearing cup 24 mounted in a back plate 26 and suitable bearing support means, not shown, provided in the front plate 14. Three pillars 28 (only two shown in the drawing) integrally project from the front plate 14 through apertures 30 in the back plate 26 and serve to maintain the front and back plates 14, 26 in assembled relation. Front plate 14 of the motor 10 may be die cast zinc or other suitable nonmagnetic material providing a solid bearing support, and back plate 26 is desirably formed of a lightweight nonmagnetic material such as aluminum.

Supported on the pillars 28 between the front and back plates 14, 26 is an alternating current field structure 32 having apertures 34 through which the pillars 28 extend. The field structure 32 includes an AC field coil 36 wound on a plastic bobbin 38 to which suitable leads, not shown are connected to a conventional source of AC power, not shown. A pair of ferromagnetic flux conducting field plates 40, 42 are shown in the preferred embodiment disposed on opposite sides of the rotor assembly 22 and respectively having offset inwardly turned arm portions 44, 46 connected together by fastening means such as the illustrated rivet 48 centrally disposed within coil 36 and bobbin 38. The field plates 40 and 42 are provided arcuate edge portions 52 and 54 symmetrically positioned on opposite sides of the rotor assembly 22 and providing electromagnetic pole projections 56, 56A and 58, 58A respectively shown in diametrically opposed relation to provide a stator structure wherein pole projections 56, 56A and 58, 58A alternate in magnetic polarity in accordance with the frequency of the AC source.

Supported adjacent a rear face of rotor pinion 18 is a permanent magnet rotor 60 which is preferably of a ceramic type permanent magnet having a relatively high available MMF. The permanent magnet rotor 60 is a flat annular disk which will be understood to be coaxially fixed to shaft 20 and supported on the same for rotation.

In the specifically illustrated embodiment of this invention, eighteen permanent magnetic poles are suitably located in the outer periphery or circumferentially extending edge of the rotor 60, and the preferred embodiment of the rotor 60 is shown preferably "through-magnetized" across its thickness direction to provide like poles on its opposite axial faces (FIG. 3) with each permanent magnetic pole being of equal width W along its circumferentially extending peripheral surface. By such construction, adjacent poles have opposite magnetic states and the diametrically opposed poles of the rotor 60 are of opposite polarity as best seen in the simplified illustration set forth in FIG. 2 for clarity of illustration.

The described rotor pattern of magnetization need only be formed along a discrete peripheral edge portion of the rotor 60 since its central portion does not cooperate with stator pole projections 56, 56A and 58, 58A.

With the above-described rotor 60 centrally located in coplanar relation to the stator pole projections, once field coil 36 is energized to instantaneously produce north magnetic poles at pole projections 56, 56A and south magnetic poles at pole projections 58, 58A, e.g., adjacent permanent magnetic rotor poles will interact with the stator pole projections by repulsion of like poles and attraction of poles of opposite polarity to rotate the rotor 60 either clockwise or counterclockwise to bring the next adjacent permanent magnetic poles of opposite polarity into oppositely facing relation to their respective stator pole projections 56, 56A and 58, 58A. As the AC supply changes in polarity with the supply frequency and the instantaneous polarity of the stator poles are reversed to produce south poles at 56, 56A and north poles at 58, 58A continued reaction movement of rotor 60 is maintained in accordance with conventional motor theory and in synchronism with the AC field frequency.

In addition to each permanent magnetic pole of the rotor 60 being of substantially equal dimension along its circumferential surface or width, each stator pole projection is preferably of a corresponding dimension along the width of its face opposite the peripheral edge of the rotor 60 such that each stator pole projection width is preferably generally equal to the width of each permanent magnetic pole.

In accordance with this invention, significantly improved motor characteristics are achieved to maximize the field strength and torque of motor 10 while maintaining its rugged construction and low manufacturing costs and preserving the self-contained characteristics of the rotor unit. This is accomplished by the provision of a ferromagnetic bridge for the rotor 60 in series with the stator pole projections of the motor 10 to substantially minimize the air gap therebetween and shunt the magnetic field from one working pole of the rotor 60 adjacent a first stator pole projection such as at 56 to another permanent magnetic rotor pole of opposite polarity adjacent a second stator pole projection such as at 58.

More specifically, the embodiment shown in FIGS. 1 and 4 provides a bridge member or flux conducting spider 62 of ferromagnetic material having a hub portion coaxially aligned adjacent a rear axial face of the rotor 60 and staked directly to back plate 26. The spider 62 is shown in FIG. 1 with three diametrically opposed arms such as at 64 with each arm 64 terminating in a forwardly projecting finger or interpole 66 located in the gap between the rotor 60 and an arcuate edge portion of the field structure. A group of interpoles for each set of stator pole projections is accordingly provided with the interpoles of each group angularly spaced from one another one permanent magnetic pole width as best seen in FIG. 4 wherein it will be noted that each of the interpoles 66 is displaced from its respective stator pole projection but preferably having at least one of the interpoles such as at 66A positioned in adjacent relation thereto within a distance of one permanent magnetic pole width. The diametrically opposite interpoles 66A, 66 are also shown to be uniformly displaced from their respective stator pole projections 56, 58 in a common angular direction relative to the rotational axis of the rotor 60.

A substantially reduced reluctance flux path is thus achieved between individual rotor poles of opposite polarity and accordingly between stator pole projections in a magnetically efficient manner by the provision of the described fixed flux return member. This effect is more dramatically illustrated in the simplified schematic form shown in FIG. 2 wherein only one pair of arms 64 is provided having interpoles 66A and 66 in the gap adjacent opposite stator pole projections 56 and 58 and respectively positioned within a distance thereof of one permanent magnetic pole width. Accordingly, the stator pole projection 56 and interpole 66A (and also the pole projection 58 and interpole 66) cooperate with an individual working pole of the rotor. The field coil 36 at a particular moment provides instantaneous magnetic flux which passes through the field plate, pole projection 56, across the air gap to the rotor 60 and across a gap to the flux conducting interpole 66A so as to be shunted to the diametrically opposed rotor pole of an opposite polarity across the air gap between the rotor 60 and interpole 66 and then across the gap to stator pole projection 58.

The motor of the above described invention has been found to perform satisfactorily and provide a torque two to three times the torque of a substantially identical motor which is not provided with the disclosed fixed flux conductor.

As will be apparent to persons skilled in the art, various modifications, adaptations and variations of the foregoing specific disclosure can be made without departing from the teachings of the present invention.

I claim:

1. A synchronous motor comprising a stator including a field portion and a coil portion disposed about the field portion, the field portion including a pair of spaced flux conducting stator pole projections having a gap therebetween, the coil portion being energizable from an alternating current source to produce instantaneous opposite polarity between the stator pole projections, an annular ceramic permanent magnet rotor supported for rotation about an axis perpendicular to a plane extending between the stator pole projections and with peripheral edge portions of the rotor adjacent the stator pole projections, individual permanent magnetic poles being formed about the periphery of the annular ceramic permanent magnet rotor and circumferentially disposed about the periphery of the rotor in fixed relation to the rotor with adjacent permanent magnetic poles being of opposite polarity, and a flux conductor member fixed in the gap and extending in magnetic series relation between at least one pair of permanent magnetic poles of opposite polarity and in series with the stator pole projections.

2. The synchronous motor of claim 1 wherein the stator pole projections are provided by a pair of flat field plates arranged in coplanar parallel spaced relation with the stator pole projections on diametrically opposite sides of the rotor, and wherein the rotor is disposed in coplanar relation to the stator pole projections with diametrically opposed permanent magnetic poles each being of opposite polarity.

3. The synchronous motor of claim 1 wherein the fixed flux conductor member extends across the gap between diametrically opposed permanent magnetic rotor poles of opposite polarity and terminates in a pair of interpoles respectively positioned in the gap adjacent one of the stator pole projections and spaced apart therefrom a distance less than one permanent magnetic pole width with the interpoles each being displaced in a common angular direction from its respective stator pole projection relative to the rotational axis of the rotor.

4. The synchronous motor of claim 1 wherein the fixed flux conductor member is provided with multiple terminal projections disposed in the gap between the rotor and the field portion of the stator with the terminal projections serving as interpoles and being spaced apart from one another one permanent magnetic pole width.

5. The synchronous motor of claim 1 wherein each permanent magnetic pole is of substantially equal width, and wherein each stator pole projection width is generally equal to the width of each permanent magnetic pole.

6. The synchronous motor of claim 1 wherein the fixed flux conductor comprises a spider of ferromagnetic material having a hub coaxially aligned with the rotor adjacent one axial face thereof and a plurality of arms extending from the hub in diametrically opposite directions, the arms each terminating in a projection extending parallel to the rotor axis into the gap between the rotor and the field portion of the stator and providing a group of interpoles for each of the stator pole projections respectively, each group of interpoles being angularly spaced from one another one permanent magnetic pole width, and the interpoles in each group being displaced from their stator pole projection but having at least one of the interpoles positioned in adjacent relation thereto within a distance of one permanent magnetic pole width.

7. The synchronous motor of claim 1 wherein each individual permanent magnetic pole is of the same polarity at opposite axial faces of the rotor, and wherein the rotor is provided with a plurality of permanent magnetic poles symmetrically arranged in diametrically opposed relation with the diametrically opposite permanent magnetic poles being of opposite polarity.

8. The synchronous motor of claim 2 wherein the flux conductor member bridges the gap between diametrically opposed permanent magnetic poles and terminates in a pair of interpoles located in the gap respectively adjacent one of the stator pole projections, the interpoles each being displaced from its respective stator pole projection but being located within a distance of one permanent magnetic pole width thereof.

9. The synchronous motor of claim 4 wherein each permanent magnetic pole is of substantially equal width and wherein each stator pole projection width and each interpole width is generally equal to the width of each permanent magnetic pole.

10. A synchronous motor comprising a stator including a field portion and a coil portion disposed about the field portion, the field portion including a pair of spaced flux conducting stator pole projections having a gap therebetween, the coil portion being energizable from an alternating current source to produce instantaneous opposite polarity between the stator pole projections, a generally disklike annular ceramic permanent magnet rotor supported for rotation about an axis perpendicular to a plane extending between the stator pole projections and with peripheral edge portions of the rotor adjacent the stator pole projections, individual permanent magnetic poles being formed about the periphery of the annular ceramic permanent magnet rotor and circumferentially disposed about the periphery of the rotor in fixed relation to the rotor with adjacent permanent magnetic poles being of opposite polarity, the permanent magnetic poles each being through-magnetized in the direction of the thickness of the rotor to provide like poles on opposite axial faces of the rotor with each permanent magnetic pole being of equal width along its circumferentially extending peripheral surface, and a flux conductor member fixed in the gap and extending in magnetic series relation between at least one pair of permanent magnetic poles of opposite polarity and in series with the stator pole projections, the fixed flux conductor member extending across the gap between diametrically opposed permanent magnetic rotor poles of opposite polarity and terminating in a pair of interpoles respectively positioned in the gap adjacent one of the stator pole projections and spaced apart therefrom a distance less than one permanent magnetic pole width with the interpoles each being displaced in a common angular direction from its respective stator pole projection relative to the rotational axis of the rotor, and each stator pole projection and each interpole having a width generally equal to the width of each permanent magnetic pole.

* * * * *